Sept. 10, 1968   J. W. HORN ET AL   3,400,797
ELECTROMAGNETIC CLUTCH OR BRAKE WITH DUAL COILS
Filed July 5, 1966

INVENTOR.
Glenn S. Spencer
John W. Horn
BY
W. S. Thompson
ATTORNEY

United States Patent Office 3,400,797
Patented Sept. 10, 1968

3,400,797
ELECTROMAGNETIC CLUTCH OR BRAKE
WITH DUAL COILS
John W. Horn, Horseheads, and Glenn S. Spencer, Big Flats, N.Y., assignors to The Bendix Corporation, a corporation of Delaware
Filed July 5, 1966, Ser. No. 562,687
4 Claims. (Cl. 192—84)

ABSTRACT OF THE DISCLOSURE

An electromagnetic torque exchanging device. The armature, as one torque exchanging member, is biased toward the other torque exchanging member and the torque exchanging contact is terminated by energization of plural electromagnetic coils which causes the armature to separate from the other torque exchanging member. When the torque exchanging relation is terminated, switching means reduce the flux to a level sufficient to maintain the non-torque exchanging mode by automatically short-circuiting all of the electromagnetic coils but one.

---

Figure 1:
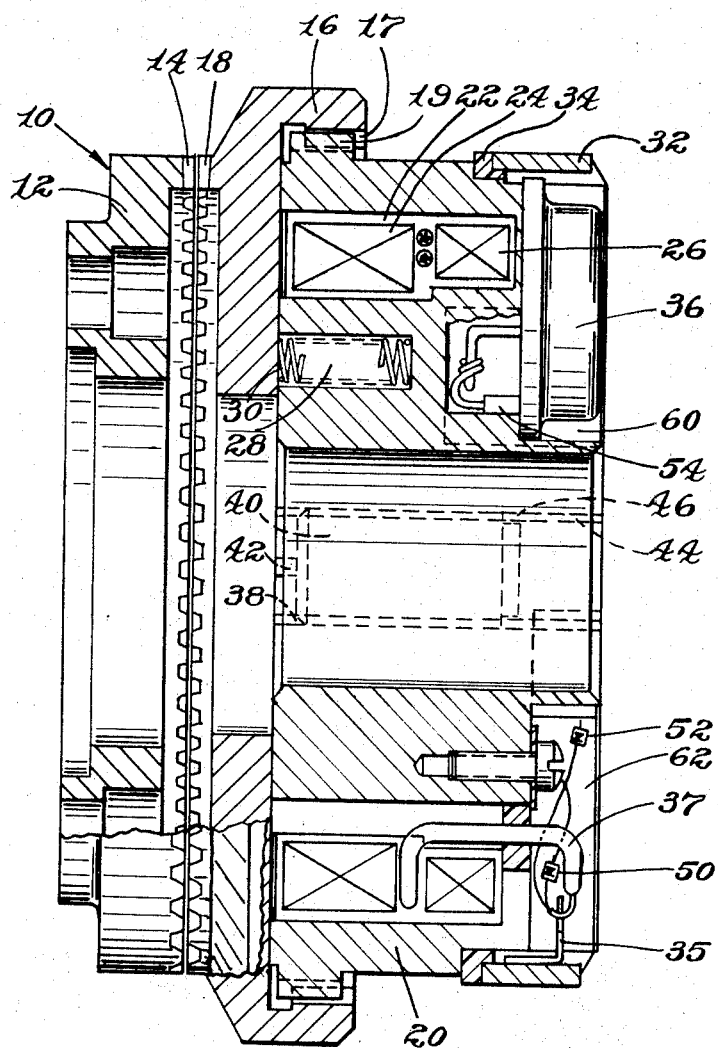

The present invention relates to an electromagnetic clutch or brake and, more particularly, to an electromagnetic clutch or brake having a plurality of coils and a switching device to select energization of the coils.

It is an object of the present invention to provide a novel electromagnetic clutch and brake having a plurality of coils and an automatic switching network contained in or fastened to the clutch.

It is an object of the present invention to provide a novel two coil electromagnetic clutch or brake having a switching network contained within the clutch to prevent mechanical damage or destruction to the switching network.

It is an object of the present invention to provide a novel two coil electromagnetic clutch or brake in which a solid state switch controls which coil shall be energized.

It is an object of the present invention to provide a novel two coil electromagnetic clutch or brake in which the combination of a solid state electrical switch and a mechanical position-sensing switch are employed to selectively energize the coils.

It is an object of the present invention to provide a novel two coil electromagnetic clutch or brake in which one coil is a "pull-in" or engagement coil and the other coil is a holding coil, and in which the coils are selectively energized in a manner to reduce current draw and increase the efficiency of the electromagnetic clutch or brake.

It is a still further object of the present invention to provide a novel two coil electromagnetic clutch or brake in which switching from one coil to another coil is significantly faster than known clutches.

It is a still further object of the present invention to provide an encapsulated switching circuit for a two coil electromagnetic clutch or brake in which the reliability is significantly increased by encapsulating the switching mechanisms within the clutch.

It is a still further object of the present invention to provide a novel two coil electromagnetic clutch or brake in which arc suppression devices are packaged within the clutch.

The foregoing and other additional objects and advantages of the present invention will appear more fully hereafter from a consideration of the detailed description which follows, taken together with the accompanying drawing wherein an embodiment of the present invention is illustrated. It is to be expressly understood, however, that the drawing is for the purpose of illustration and description and is not to be construed as defining the limits of the invention.

Figure 2:
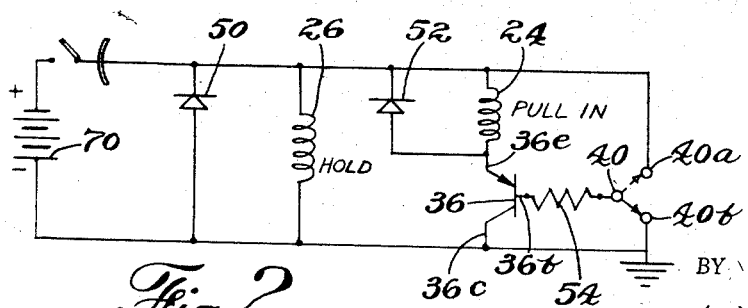

FIGURE 1 shows a sectional view of an electromagnetic clutch or brake partially broken away; and
FIGURE 2 is a diagrammatic view of the electrical circuit which may be used in conjunction with the clutch or brake shown in FIGURE 1.

Turning now to FIGURE 1, numeral 10 shows generally an electromagnetic clutch or brake having a housing containing a first torque transmitting member or absorbing member 12 having a toothed torque transmitting surface 14 engaging a similar toothed torque transmitting surface 18 of the second torque transmitting member 16. Torque transmitting member or torque members 12 may be thought of as the driven member and the second torque transmitting member 16 may be thought of as the driving or armature member. The present invention is capable of transmitting torque from first torque member 12 to second torque member 16. The torque member 16 has splines 17 formed thereon for engaging splines 19 of a magnet body 20. The magnet body 20 has a cavity 22 formed therein for containing a first coil 24 and a second coil 26. Also contained in the magnet body 20 is a cavity 28 into which is fitted a resilient member shown as a spring member 30 biasing the torque members 12 and 16 in a torque transmitting direction. A third cavity 38 is threaded at 44 to receive a switch member 40 having an extending movable portion 42 which is threaded at 46 to engage the threads 44. The switch member is, by virtue of its threaded connection to the magnet body, adjustable axially relative to the magnet body 20.

A fourth cavity 60 is formed in the magnet body or clutch member to contain a transistor member 36 which is used as a solid state switching device and which is also a current amplifying device. Electrically connected to the transistor member 36 is a resistor member 54. A slip ring member 32 is insulated from the magnet body by insulator 34. Slip ring 32 supplies power to a conductor member 35 which is, in turn, linked to lead 37 which supplies power to the coil members 24 and 26, shown in both FIGURES 1 and 2. A plurality of diodes 50 and 52 are contained within the magnet body 20 to prevent arcing and to permit the slow dissipation of stored energy in the coils as the switch switches the energization of the coils. Other arc suppression devices such as resistors, and resistors and capacitors in combination, or capacitors alone could be employed. A fifth cavity 62 is formed in the clutch member 20 to contain the diode members or other arc suppressors and other electrical apparatus.

Turning now to the circuit shown in FIGURE 2, it can be seen that the source of electrical energy, shown as a battery 70, is adapted to be connected to the holding coil 26 which is normally the smaller power coil, and to supply power to the "pull-in" coil 24. The "pull-in" coil 24 normally is capable of exerting greater mechanical pull than the holding coil since more energy is required to move the movable torque member 16 than is required to hold it in position once it is moved. It is precisely this fact which contributes to making the present invention desirable economically. Since less power is required for holding torque member 16 out of engagement, electrical power dissipation is reduced. Resilient member 30 supplies the force necessary to prevent torque member disengagement during torque transmission. The transistor member 36 has its emitter lead 36e connected to one end of coil 24, its collector lead 36c connected to ground and the base lead 36b connected to the resistor member 54 (which in some cases may be thought of as a portion of the switch member 40). Switch 40, as can be seen, changes the bias on the base of the transistor when it moves from position 40a to position 40b, as shown in FIGURE 2. When the switch is in position 40a, the bias on the base of the transistor is that of an external potential and is such that for the PNP transistor shown, the transistor is off and no current will be drawn through the "pull-in" coil 24. On the other hand, when the switch is in the position 40b, the base of the transistor will be kept at a potential more nearly to the ground potential and the transistor will be in a conducting mode, allowing current to be drawn through the "pull-in" coil and thereby attracting the movable torque member 16 and disengaging the dentil teeth 14 and 18.

The "pull-in" coil is normally of a much lower resistance and it, therefore, will be able to draw a much higher current out of the electrical source 70 than the holding coil 26. It should be noted that during "pull-in," both coils will be in operation and that the combination of a mechanical-electrical switch serves to switch in and out only the "pull-in" coil in the present embodiment of the invention. Diode members 50 and 52 are to allow the stored energy in the coils 24 and 26 to be dissipated through them when these coils are de-energized. A position sensing switch 40 may be used with the present invention. The embodiment of the invention shown in FIGURES 1 and 2 incorporates a switch which has a mechanical feeler member 42 which senses the position of the movable torque member 16. However, a flux density switch could be used or a simple timing mechanism could be used to determine the length of time of the "pull-in" coil's conduction. A transistor 36, in addition to acting as a switch, also acts as a current amplifier member and thereby reduces the necessary current rating of the contacts of the mechanical switch 40. Transistor member 36 could be a NPN transistor which would mean that the polarity of some of the circuit elements such as the battery and the diodes would be reversed.

It can be readily appreciated that the present invention accomplishes its stated objects. The invention may be practiced whether the clutch is of a stationary field or of a slip ring type. The invention may further be practiced whether the torque transmitting surfaces 14 and 18 are a tooth type or a friction type.

The present invention is capable of high speed switching. The present invention is further capable of saving a considerable amount of electric power over prior devices which merely insert a resistor in the circuit to cut down the power supplied to the "pull-in" coil. Encapsulation of the electrical parts within the magnet body or some other part of the clutch protected within the housing protects the circuit parts from any mechanical damage due to shock and other factors. Encapsulation is accomplished by using a moldable material, typically an epoxy, to hold both the elements in place and electrically isolate them from the magnet body. Thus, the present invention describes a more highly reliable and faster acting, less destructible electromagnetic clutch or brake having a two-stage energization and automatic switching.

We claim:
1. An electromagnetic clutch or brake comprising:
   first and second torque members;
   one of said torque members adapted to execute limited motion, with respect to the other torque member, between a first engaged position and a second disengaged position;
   first and second coil means in operative electromagnetic association to cause said one of said torque members to execute said limited motion from said first position to said second position;
   said first coil means operative to maintain said one of said torque members in said second position;
   switch means operatively connected to said clutch or brake for selectively controlling the energization of said second coil means;
   said switch means including a position sensing switch and a solid state switching device such that as said one of said torque members approaches said second position, said switching means short-circuits said second coil means.
2. The apparatus as claimed in claim 1 including further:
   resilient means biasing said first and second torque means in a torque transmitting direction.
3. The apparatus as claimed in claim 1 wherein:
   said switching means is positioned in and insulated from said torque member by a moldable material.
4. The apparatus as claimed in claim 1 including further:
   electrical means in parallel with said coil means to provide a discharge path for the energy stored in said coil means.

References Cited

UNITED STATES PATENTS

| | | | |
|---|---|---|---|
| 3,331,481 | 7/1967 | Wrensch | 192—84 |
| 3,328,983 | 7/1967 | Brucken et al. | 192—84 |
| 3,252,022 | 6/1966 | Smith | 192—84 |
| 3,215,902 | 11/1965 | Foley et al. | 317—123 |
| 3,016,580 | 1/1962 | Jaeschke | 192—84 |
| 2,875,876 | 3/1959 | Rudisch | 192—84 |
| 1,671,057 | 5/1928 | Brainard | 192—84 XR |
| 727,691 | 5/1903 | Knowlton | 192—84 |

MARTIN P. SCHWADRON, *Primary Examiner.*

CARLTON R. CROYLE, *Examiner.*

C. LEEDOM, *Assistant Examiner.*